(12) United States Patent
Gusev et al.

(10) Patent No.: US 8,954,557 B2
(45) Date of Patent: Feb. 10, 2015

(54) ASSIGNING SERVER CATEGORIES TO SERVER NODES IN A HETEROGENEOUS CLUSTER

(75) Inventors: Andrey Gusev, Dublin, CA (US); Jonathan Creighton, Oakland, CA (US); David Brower, Alamo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 171 days.

(21) Appl. No.: 13/401,638

(22) Filed: Feb. 21, 2012

(65) Prior Publication Data

US 2013/0219036 A1 Aug. 22, 2013

(51) Int. Cl.
*G06F 15/173* (2006.01)
*G06F 15/177* (2006.01)

(52) U.S. Cl.
USPC ........... 709/223; 709/220; 709/221; 709/222; 709/224; 709/225; 709/226

(58) Field of Classification Search
USPC .................................. 709/223–226, 220–222
See application file for complete search history.

(56) References Cited

U.S. PATENT DOCUMENTS

| | | | | |
|---|---|---|---|---|
| 5,774,668 A * | 6/1998 | Choquier et al. | ............. | 709/223 |
| 6,836,750 B2 * | 12/2004 | Wong et al. | ................... | 702/186 |
| 7,281,045 B2 * | 10/2007 | Aggarwal et al. | ............. | 709/226 |
| 7,644,161 B1 * | 1/2010 | Graupner et al. | ............. | 709/226 |
| 2002/0069279 A1 * | 6/2002 | Romero et al. | ................ | 709/225 |
| 2004/0133622 A1 * | 7/2004 | Clubb et al. | .................. | 709/200 |
| 2006/0047813 A1 * | 3/2006 | Aggarwal et al. | ............. | 709/226 |
| 2007/0094375 A1 * | 4/2007 | Snyder et al. | ................. | 709/223 |
| 2007/0250608 A1 * | 10/2007 | Watt | .............................. | 709/222 |
| 2008/0244068 A1 * | 10/2008 | Iyoda et al. | .................... | 709/224 |
| 2011/0029651 A1 * | 2/2011 | Snyder et al. | ................. | 709/223 |

* cited by examiner

*Primary Examiner* — Edward Kim
(74) *Attorney, Agent, or Firm* — Shun Yao; Park, Vaughan, Fleming & Dowler LLP (57) ABSTRACT

A cluster management system dynamically assigns a category to a server node based on the server node's attributes. The system can detect a change in value of a server attribute of a first server node. Then, in response to detecting the change in value of the server attribute, the system identifies a plurality of server attributes for the first server node, and dynamically assigns to the first server node a category that matches the server attributes. Further, the system can add the server node to a server pool that has a matching category with the server node.

21 Claims, 8 Drawing Sheets

ASSIGNING SERVER CATEGORIES TO SERVER NODES IN A HETEROGENEOUS CLUSTER

BACKGROUND

1. Field of the Invention

The present disclosure relates to server clusters. More specifically, the present disclosure relates to a method and system for dynamically assigning a server node to a server pool based on a category corresponding to the server node's attributes.

2. Related Art

A computer cluster consists of a multitude of computer nodes that work together, for instance, to host applications such as a Web service. The computer cluster can facilitate scaling the amount of resources consumed by an application as the server demand from the application changes over time. For example, an application developer can deploy a new application using a small number of server nodes in a cluster. Then, as the number of users grows for the application, the application developer can purchase additional server nodes to handle the increase in demand. A system administrator for this application can create a policy that models the functional requirements of the application, and that indicates the server nodes needed by the application.

Oftentimes, the system administrator expresses the application's requirements in terms of explicit resource entities that represent the application's components, as well as the relationships and dependencies between components. However, the resource is expressed as a reference to a physical (a computer node, a disk, a volume, etc.) or logical (an IP address, a DB instance, a database service, a server pool, etc.) entity comprising the application. For example, the system administrator may select computer nodes because they have at least a certain amount of memory, they have a certain number of CPU cores, or they exist at a particular site. Once the system administrator models the entities used by the application, the cluster system uses this information to manage the entire application across these explicitly referenced entities. Unfortunately, explicitly setting the names of computer nodes is inherently inflexible as any change to the set of nodes in a cluster can require the system administrator to change the application's configuration.

As an alternative to explicitly referencing cluster entities, the system administrator may control an application's resource placement by expressing the application's requirements in terms of server pools that can be used to deploy the application. For example, the system administrator can indicate a server pool that has a desired number of computer nodes, and the cluster system can deploy the application using computer nodes from the server pool. However, for the application to achieve an expected behavior, the cluster needs to include computer nodes that satisfy the application's requirements.

Unfortunately, computer clusters tend to become nonhomogeneous over time. Organizations that deploy a cluster to host their applications typically do not want to create a cluster that has an undesirably large pool of unused computer nodes; thus, they may add computer nodes to the cluster as demand grows for their services. Unfortunately, adding new computing nodes to the cluster can result in a cluster that has a heterogeneous collection of computing nodes with varying computing capabilities. These variations in computing capabilities can make it difficult for a cluster to create a pool of computing nodes whose capabilities are sufficiently consistent and predictable for an application.

SUMMARY

One embodiment of the present invention provides a cluster management system that dynamically assigns a category to a server node based on the server node's attributes. The system can detect a change in value of a server attribute of a server node. Then, in response to detecting the change in value of the server attribute, the system identifies a plurality of server attributes for the server node, and dynamically assigns to the server node a category that matches the server attributes.

In some embodiments, the server node can belong to a server pool in the cluster, such that the server pool is associated with the assigned category. Then, in response to detecting the change in value of a server attribute, the system can reconsider whether the server node belongs in the server pool. Specifically, the system can determine an attribute expression associated with the category, and can determine attribute-requirements from the attribute expression. Then, if the system determines that the server node's server attributes do not satisfy the attribute-requirements, the system can disassociate the server node from the category, and can remove the server node from the server pool.

In some embodiments, an application's policy that indicates a category for a desired server pool can also indicate a minimum number of server nodes that are to belong to the server pool. Thus, when the system determines that the application's server pool does not satisfy the minimum number of server nodes, the system can select a server node from another server pool, such that the other server node satisfies the attribute-requirements for the category, and the other server pool has a lower priority than the application's server pool. Then, the system can transfer the server node to the application's server pool.

In some embodiments, the first server node can be associated with a category and can belong to a server pool in the cluster, and the server pool can be associated with the first category. Then, in response to detecting a change in value of an attribute of a server node, the system can dynamically assign the server node to another category associated with a second server pool. Also, if the system determines that the other server pool has a higher priority than the server node's initial server pool, the system can transfer the server node to the other server pool. Also, the system can select an application whose policy indicates the other category, and can deploy the application on the server node.

In some embodiments, the system can determine whether the server node belongs in a category by first determining an attribute expression associated with the category, and determining attribute-requirements from the attribute expression. Then, if the system determines that the server node's server attributes satisfy the attribute-requirements, the system can proceed to assign the category to the server node.

In some embodiments, the attribute-requirements indicate at least one of: a number of server nodes for a server pool; a number of available processors at a server node; an amount of available random-access memory at a server node; an amount of available non-volatile storage memory at a server node; an operating system kind; an operating system version; a geographic location of a server node; and a determinable value for a user-defined preference of a server node.

In some embodiments, the change in value of the server attribute includes at least one of: the insertion of the first server node into the cluster; the removal of the first server node from the cluster; a change in a number of available processors for the first server node; a change in an amount of random-access memory in the first server node; a change in an amount of non-volatile storage memory in the first server node; a change in an operating system kind; a change in an operating system's version; and a change in a numerical value for a user-defined preference of the first server node.

In some embodiments, in response to detecting the change in value of an attribute of a server node, the system can publish the server node's server attributes to other server nodes in the cluster. Further, the system can receive, from another server node in the cluster, a pool-assignment that assigns the server node to a server pool in the cluster.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Overview

Embodiments of the present invention provide a cluster management system that solves the problem of providing a policy-managed cluster, where server nodes are dynamically selected for a server pool based on whether these server nodes match the server requirements in an application's policy. For example, a cluster may not include a homogeneous collection of server nodes that have identical server attributes, and different applications will have policies that indicate requirements that differ from other applications. To make matters worse, the value of a server node's attributes (e.g., its capabilities or preferences) can change over time.

In some instances, the value of a server node's attribute may change due to a system failure (e.g., the server or a component fails), due to a temporary downtime for a routine maintenance, or due to a system upgrade or downgrade where hardware and/or software components of the server node may change. In some other instances, the availability of a server node may change when the server node is added or removed from a cluster, or when the server node is moved to a different geographic location. Thus, the cluster management system facilitates ensuring that an application is deployed on the appropriate server nodes, even as the value of certain server attributes changes for different nodes across the cluster over time.

In some embodiments, when a new server node is deployed in a cluster or when an existing server node's attributes change, the system can dynamically assign a category to the server node to describe the updated attributes of the server node. A category is a logical identifier that corresponds to a plurality of server attributes. Thus, the system can assign a category to a server node whose attributes satisfy the category's attribute requirements. The system can use the categories assigned to different server nodes to dynamically manage the server nodes that belong to a server pool, and to manage which applications are deployed on a given server node or server pool.

The term attribute refers to a characteristic of a server node, which may be an auto-discovered attribute or a user-assigned attribute. For example, an auto-discovered attribute can include a CPU count, a memory size (e.g., for volatile or non-volatile memory), an operating system kind or version, a geographic location, or any characteristic of the server node that can be auto-discovered by the server node. Also, a user-assigned attribute can include a numerical value that indicates a user-defined preference for a server node or for a server pool. A server node, for example, can have a user-assigned attribute that indicates a priority level used to determine which server nodes in a pool can be selected first to transfer to a different server pool. Also, a server pool can have a user-assigned attribute that indicates a minimum number of server nodes for the server pool, a priority level for the server pool, or any other numerical value.

A category can have an attribute-requirements expression, which can be a Boolean expression that combines a plurality of attributes using Boolean logic to indicate conditions for determining whether a server node belongs to the category. Thus, when the system detects a change in a node's attributes (e.g., when a server node or a component of the server node fails to operate, or when the server node's components are upgraded or downgraded), the system can dynamically assign to the server node one or more categories that match the node's updated attributes. Further, because a server pool can be associated with one or more categories, the system can dynamically manage the server nodes that belong to the server pool by selecting server nodes that have a category in common with the server pool. Also, because the system manages a server pool to include server nodes with a desired category, even as server attributes change for server nodes in the cluster, the system can dynamically update the collection of server nodes that belong to the server pool to ensure that an application is deployed on server nodes that satisfy the application's attribute-requirements.

Figure 1:
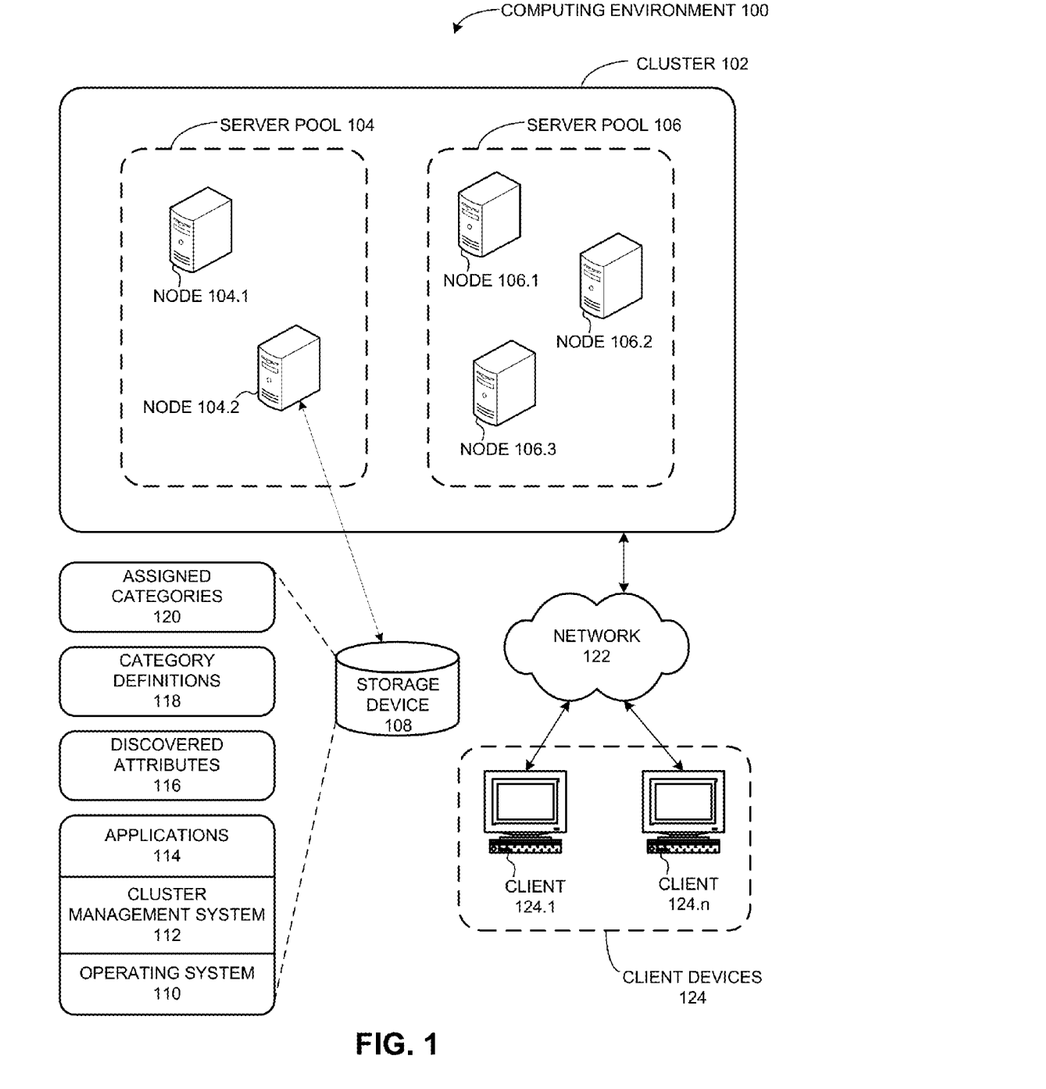
FIG. 1 illustrates an exemplary computing environment in accordance with an embodiment of the present invention.

FIG. 1 illustrates an exemplary computing environment 100 in accordance with an embodiment of the present invention. Computing environment 100 can include a computer cluster 102, a plurality of server nodes in cluster 102, a network 122, and a plurality of client devices 124.

In some embodiments, a server node (e.g., node 104.2) can be coupled to network 122 (e.g., a local area network (LAN), a wide area network (WAN), or the Internet) and to a storage device 108. Storage device 108 can include an operating system 110, a cluster management system 112, and a plurality of applications 114. Further, storage device 108 can include discovered attributes 116, which includes a collection of attributes that may be either auto-discovered by the server node or user-assigned (e.g., by a system administrator). In some embodiments, when the server node discovers an attribute (e.g., when server node 104.2 discovers a new attribute or discovers a change to an existing attribute), the server node can publish the discovered attribute to other server nodes in the cluster (e.g., publish the attribute to server node 104.1 and server nodes 106.1-106.3).

Storage device 108 can also include category definitions 118 and assigned categories 120. Category definitions 118 can indicate attribute-requirement expressions for a plurality of categories, and may use these expressions to determine which of categories 118 can be assigned to a server node. Further, assigned categories 120 can indicate which categories have been assigned to a certain server node. In some embodiments, assigned categories 120 for a server node can be stored as a type of attribute (e.g., in attributes 116) of the server node.

Cluster 102 can include a plurality of server nodes that can be organized into server pools based on their assigned categories. For example, server pool 104 can include at least nodes 104.1 and 104.2, and server pool 106 can include at least nodes 106.1, 106.2, and 106.3. In some embodiments, a server pool (e.g., server pool 104) can include server nodes whose categories match those of an application's policy. Further, a server node that has not been added to a server pool can belong to a free pool.

In some embodiments, cluster management system 112 can use a server pool entity object to indicate attributes for a server pool, such that the server pool entity object can include a category attribute for the server pool. Cluster management system 112 can use the category attribute to assign one or more categories to a server pool, such that these categories indicate the conditions for selecting a server node for the server pool. Also, an application's policy can specify one or more categories to indicate attribute-requirements for a server node onto which the application may be deployed. Thus, when deploying an application on a server pool, cluster management system 112 can assign the application's categories to the server pool as attributes.

For example, the system may create server pool 104 to host two applications, A and B. Thus, the system may determine a set of categories indicated by the policies of applications A and B, and can assign these categories to server pool 104. Then, cluster management system 112 can use these categories assigned to server pool 104 to dynamically adjust the server nodes that belong to server pool 104 (e.g., based on the categories that are dynamically assigned to server nodes in response to a change in a server node's attributes). Therefore, because the system assigns server nodes to pools based on dynamically assigned categories, the system can shuffle server nodes with varying characteristics across clusters without requiring the system administrator to change an application's configuration to take advantage of new or upgraded server nodes. Server pools that host the application can dynamically add server nodes whose categories match those of the server pool, and can reject those server nodes that do not have a matching category.

In some embodiments, an application's policy may specify a relative importance parameter, which indicates a priority level for its server pool relative to those of other server pools. For example, application A may specify a new category whose attribute-requirements indicate that a server pool only use server nodes with at least 16 GB of RAM, that it is to be deployed on two to three server nodes, and that it has a relative importance of 10. Thereafter, cluster management system 112 may configure application A to run in server pool 104. As a further example, an application C may specify that a server pool only use server nodes with at least 8 GB of RAM, that it is to be deployed on three server nodes, and that it has a relative importance of 5. Thereafter, cluster management system 112 may configure application C to run in server pool 106.

However, if server node 104.1 goes offline (e.g., due to a server failure) or server node 104.1 is dynamically assigned to a different category (e.g., in response to the system detecting only 8 GB of RAM as being operational), the system will need to add another server node to server pool 104 from the cluster to satisfy the requirement from application A that server pool 104 is to include at least two server nodes. If there are no available server nodes, the system can transfer a server node from server pool 106 (which has a priority of 5) to server pool 104 (which has a higher priority of 10), such that the transferred server node has a category that matches that of server pool 104.

Figure 2:
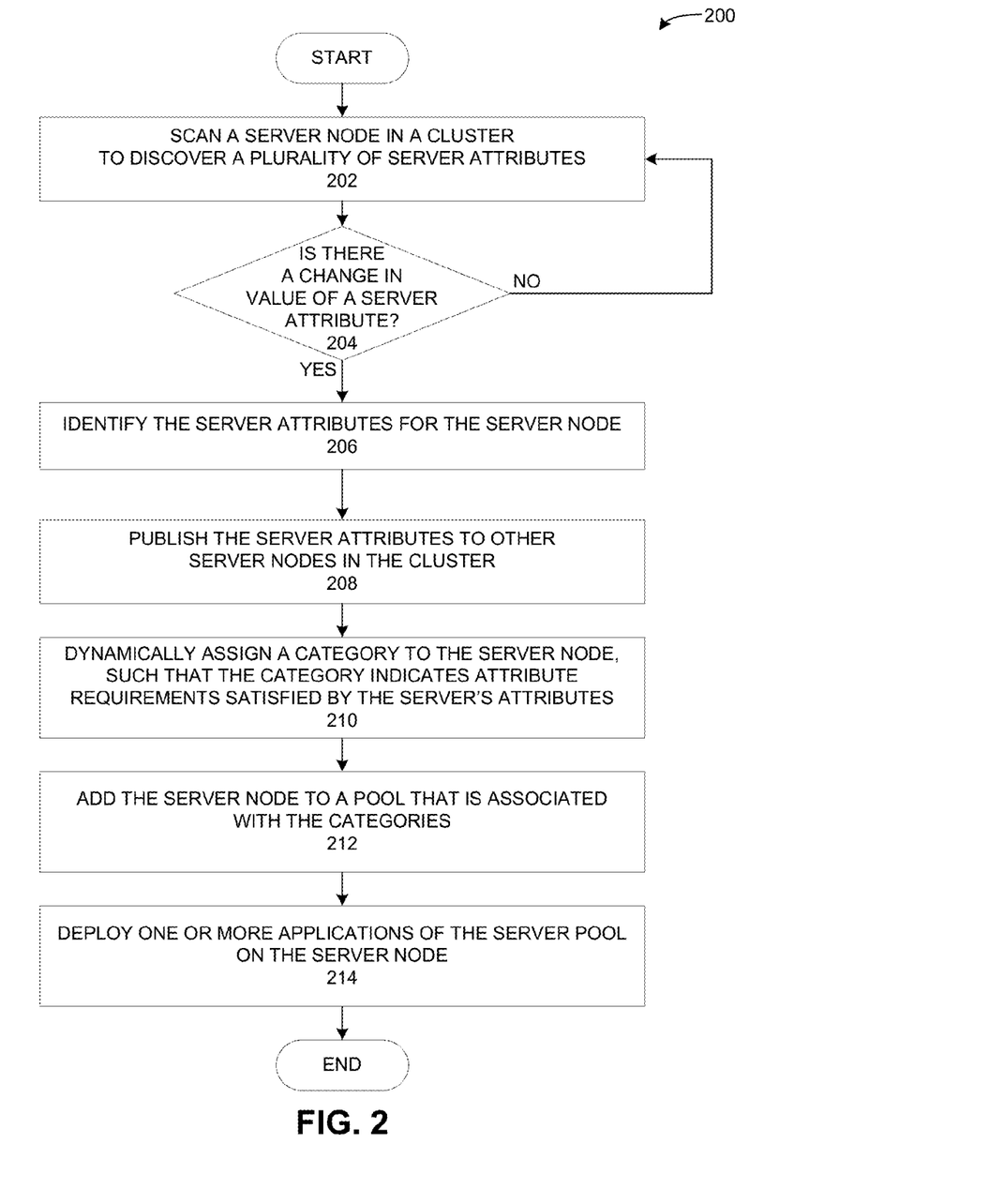
FIG. 2 presents a flow chart illustrating a method for dynamically assigning a server node to a category in accordance with an embodiment of the present invention.

FIG. 2 presents a flow chart illustrating a method 200 for dynamically assigning a server node to a category in accordance with an embodiment of the present invention. During operation, the system scans a server node in a cluster to discover a plurality of server attributes (operation 202). Then, the system determines whether there is a change in value of a server attribute (operation 204). For example, the system can detect a change in availability of a server node, such as when the server node is added into a cluster, or when the server node is removed from the cluster. As another example, the system can detect a change in availability of a component of the server node, such as: a change in a number of available processors; a change in an amount of random-access memory; a change in an amount of non-volatile storage memory; a change in a type of operating system installed in the server node; a change in the operating system's version; and/or the like. The system can also detect a change in a numerical value for a user-defined preference of the server node.

If the system does not detect a change in value of a server attribute, the system can return to operation 202 at a later date to scan the server node (e.g., after a determinable delay period, or after a boot sequence). However, if the system determines at operation 204 that there is a change in value to at least one server attribute, the system identifies the server attributes for the server node (operation 206). The system then publishes these server attributes to other nodes in the cluster (operation 208), which facilitates ad-hoc management of server pool memberships.

Next, the system can assign a set of categories to the server node based on the node's attributes (operation 210). For example, the server's attributes may undergo a planned or unplanned change (e.g., the memory or storage size is increased during a system upgrade, or a hardware component fails to operate), at which point the server may be assigned to a different set of categories (e.g., one or more category assignments may be added and/or removed). However, if the server's attributes undergo a small change (e.g., a change to a user-defined attribute), the assigned attributes may remain substantially the same. In some embodiments, the server node can store category definitions for a plurality of categories, and can determine which of these (if any) it satisfies based on the attribute-requirements of a category definition. In some other embodiments, the category definitions can be distributed across different server nodes of the cluster. Thus, when the server node publishes its attributes to other server nodes in the cluster, the server node can receive a category assignment from one or more of the other server nodes in the cluster.

Then, the system can add the server node to a pool that is associated with one of the assigned categories (operation 212). In some embodiments, the server node can store category information for a plurality of server pools, and can determine which of these server pools (if any) has a matching category. In some other embodiments, the category information can be distributed across different server nodes of the cluster, and the server node can receive a pool assignment from one or more of the other server nodes in the cluster (e.g., from a node that belongs to the assigned pool). The system can then deploy one or more applications of the server pool on the server node (operation 214)

Figure 3:
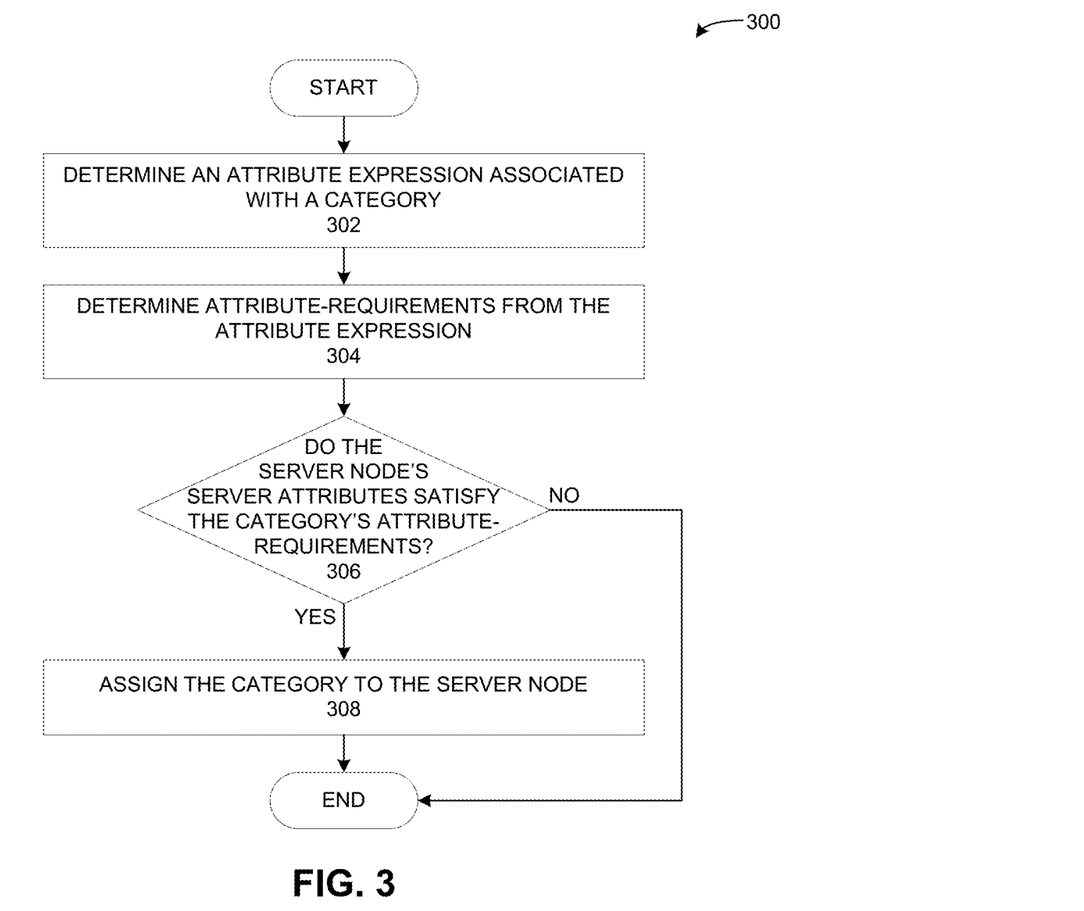
FIG. 3 presents a flow chart illustrating a method for assigning a server node to a category in accordance with an embodiment of the present invention.

FIG. 3 presents a flow chart illustrating a method 300 for assigning a server node to a category in accordance with an embodiment of the present invention. During operation, the system can determine an attribute expression associated with a category (operation 302), and can determine attribute-requirements from the attribute expression (operation 304). The attribute expression can include a Boolean expression that combines multiple attribute-requirements.

The system then determines whether the server node's attributes satisfy the category's attribute-requirements (operation 306). If so, the system can assign the category to the server node (operation 308). Otherwise, the system does not assign the category to the server node. In some embodiments, if the system does not assign any category to the server node, the system can perform a remedial action (e.g., assign the server node to a default category).

Figure 4:
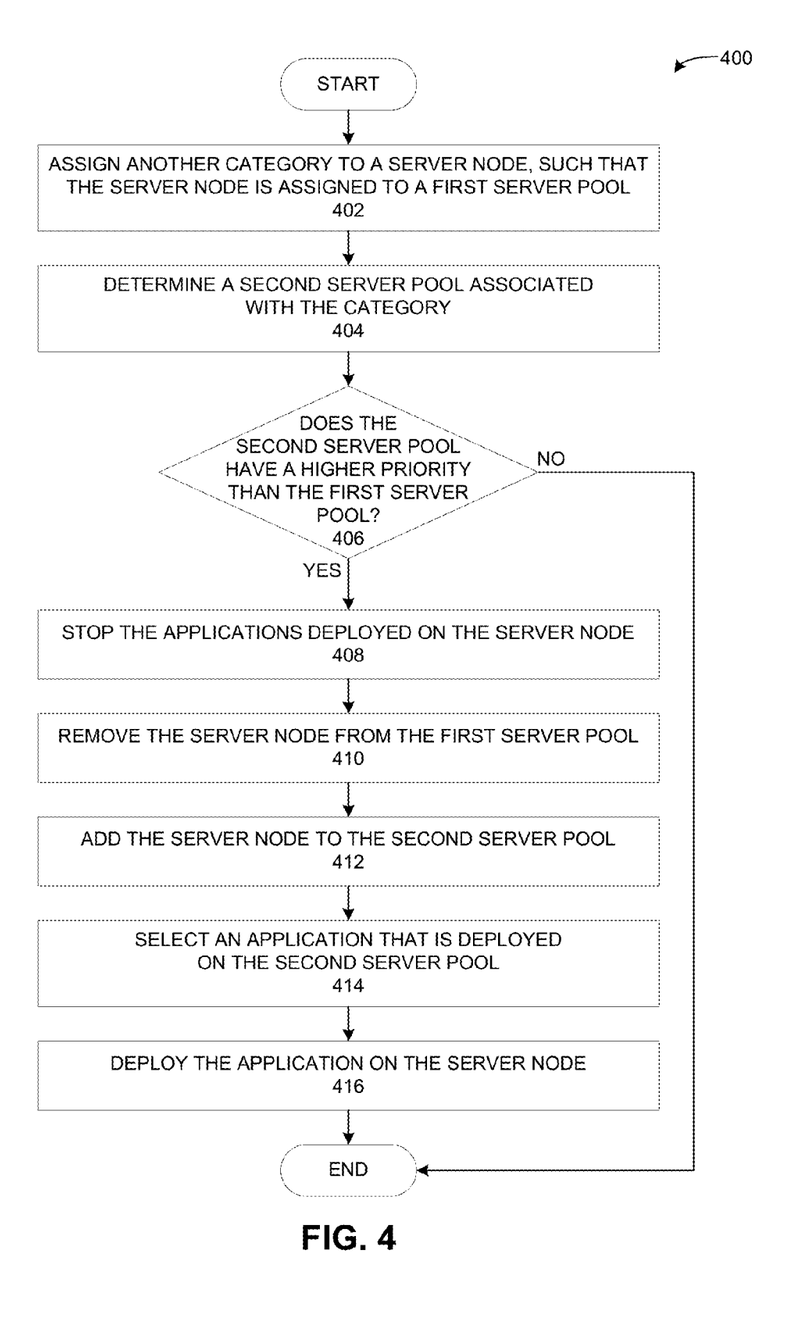
FIG. 4 presents a flow chart illustrating a method for moving a server node to a different server pool based on a dynamically assigned category in accordance with an embodiment of the present invention.

FIG. 4 presents a flow chart illustrating a method 400 for moving a server node to a different server pool based on a dynamically assigned category in accordance with an embodiment of the present invention. For example, the server node can belong to one or more categories and to a first server pool that corresponds to one of the categories. Then, during operation, the system can assign another category to the server node that corresponds to the updated server attributes (operation 402), and can determine a second server pool associated with this other category (operation 404).

Then, the system determines whether the second server pool has a higher priority than the first server pool (operation 406). If so, the system can stop the applications that are deployed on the server node (operation 408), and removes the server node from the first server pool (operation 410). Then, the system adds the server node to the second server pool (operation 412).

Further, the system can then deploy one or more applications associated with the second server pool on the server node. In doing so, the system can select an application that is to be deployed on the second server pool (operation 414), for example, an application whose policy indicates a category assigned to the second server pool. Then, the system deploys the application on the server node (operation 416).

Figure 5:
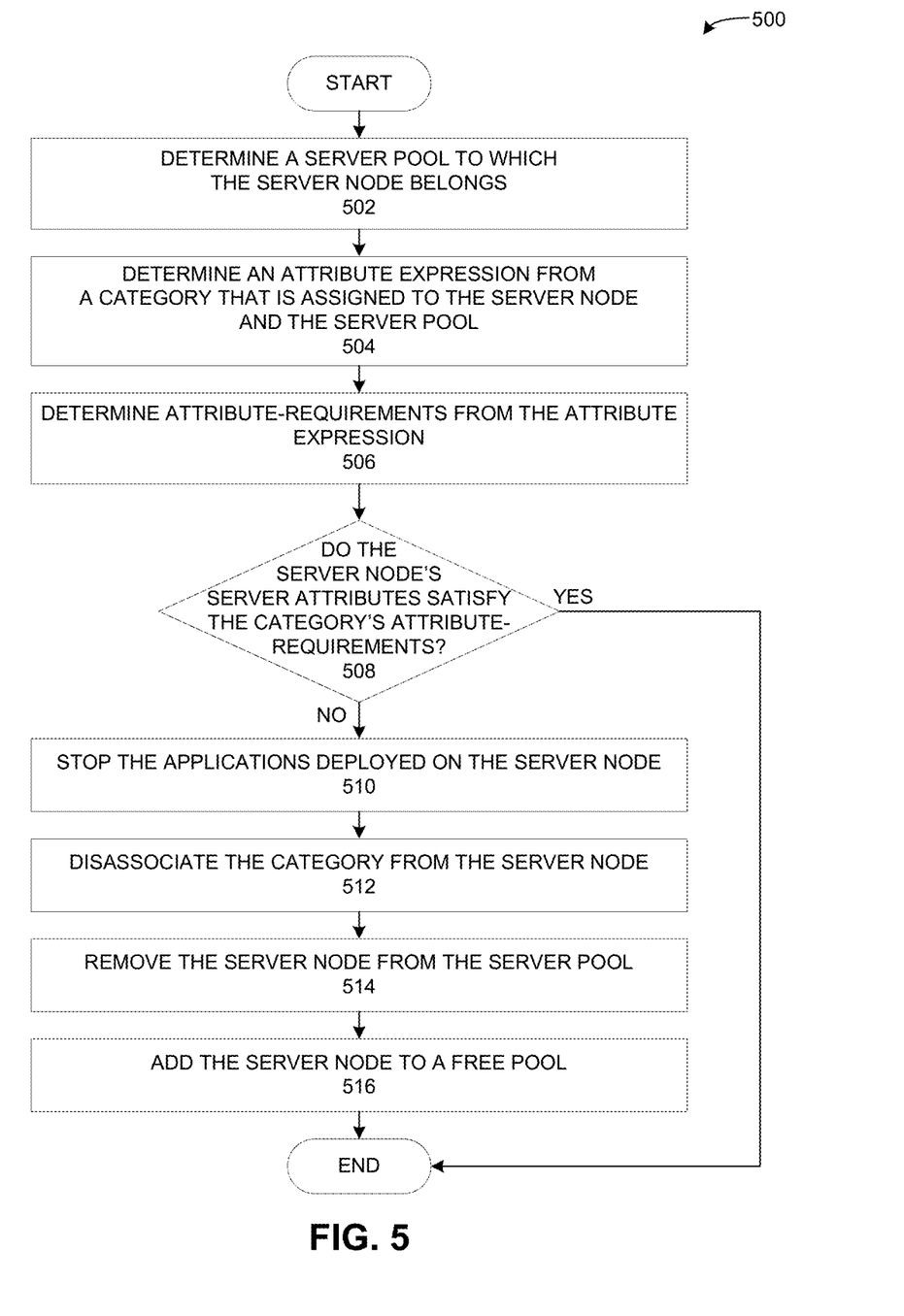
FIG. 5 presents a flow chart illustrating a method for removing a server node from a server pool when the server node does not satisfy the pool's category requirement in accordance with an embodiment of the present invention.

FIG. 5 presents a flow chart illustrating a method 500 for removing a server node from a server pool when the server node does not satisfy the pool's category requirement in accordance with an embodiment of the present invention. During operation, the system can determine a server pool to which the server node belongs (operation 502). Then, the system determines an attribute expression from a category that is assigned to the server node and the server pool (operation 504), and determines attribute-requirements from the attribute expression (operation 506).

The system then determines whether the server node's attributes satisfy the category's attribute-requirements (operation 508). If the server node's attributes do not satisfy the category's attribute-requirements, the system can remove the server node from the server pool so that it can be made available for other server pools. For example, the system can stop the applications deployed on the server node (operation 510), disassociates the category from the server node (operation 512), and removes the server node from the server pool (operation 514). In some embodiments, the system can also add the server node to a free pool that includes a plurality of available server nodes (operation 516), or the system can add the server node to another server pool based on another category associated with the server node. However, if the server node is not associated with any categories after operation 512, the system can assign the server node to a default category (e.g., a default category associated with the free server pool).

Recall that the system deploys an application within the cluster based on a policy for the application, such that the policy indicates a set of categories or attribute-requirements that the system uses to select server nodes for the application. For example, the policy may indicate one or more server categories, and the system uses these categories to select a plurality of server nodes for the application's server pool. The policy may also indicate other applications that are allowed to run in the same server pool (or that need to be deployed in the same server pool), and/or other applications that are not allowed to run in the same server pool. Further, the application's policy may also indicate a minimum (and/or a maximum) number of server nodes for the server pool.

Figure 6:
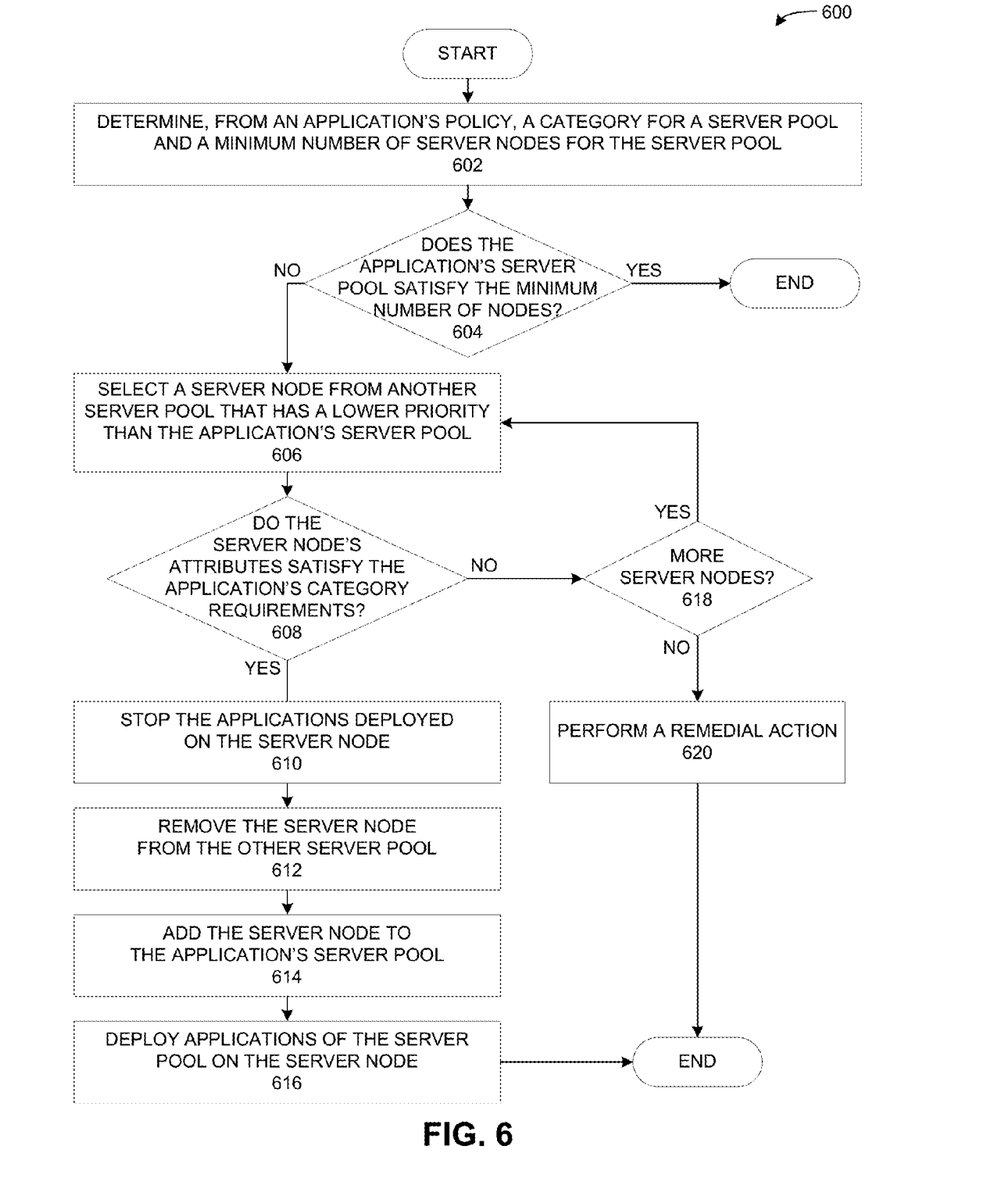
FIG. 6 presents a flow chart illustrating a method for dynamically moving server nodes to a server pool to satisfy the pool's category requirements in accordance with an embodiment of the present invention.

FIG. 6 presents a flow chart illustrating a method 600 for dynamically moving server nodes to a server pool to satisfy the pool's category requirements in accordance with an embodiment of the present invention. During operation, the system can determine, from an application's policy, a category for a server pool and a minimum number of server nodes for the server pool (operation 602). Then, the system determines whether the application's server pool satisfies the minimum number of nodes (operation 604).

If the system determines that the application's server pool does not satisfy the minimum number of server nodes, the system can select a server node from another server pool that has a lower priority than the application's server pool (operation 606). The system then determines whether the selected server node's attributes satisfy the application's category requirements (operation 608). If so, the system can stop the applications that are deployed on the server node, removes the server node from the other server pool (operation 612), and adds the server node to the application's server pool (operation 614). The system then deploys one or more applications, which are deployed on the application's server pool, on the server node (operation 616).

However, if the system determines at operation 608 that the selected server node's attributes do not satisfy the application's category requirements, the system determines whether there are more server nodes to select from other server pools with a lower priority than the application's server pool (operation 618). If so, the system returns to operation 606 to select a server node.

If the system determines that there are no more server nodes to choose from, the system can perform a remedial action (operation 620). In some embodiments, the system can perform a remedial action that informs an administrator that no more server nodes matching the policy's category are available, at which point the administrator may adjust the policy to allow the application to run on server nodes of other categories (e.g., by selecting another category that loosens certain attribute-requirements).

Figure 7:
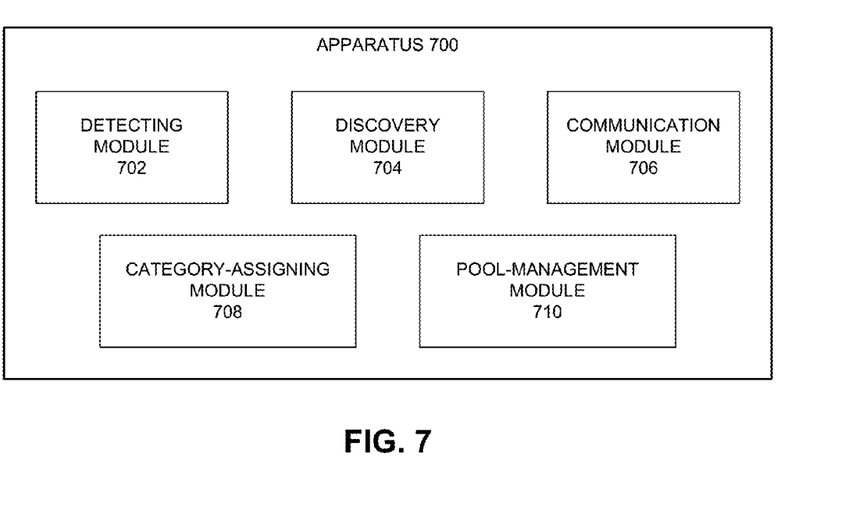
FIG. 7 illustrates an exemplary apparatus that facilitates dynamically assigning a category to a server node based on the server node's attributes in accordance with an embodiment of the present invention.

FIG. 7 illustrates an exemplary apparatus 700 that facilitates dynamically assigning a category to a server node based on the server node's attributes in accordance with an embodiment of the present invention. Apparatus 700 can comprise a plurality of modules which may communicate with one another via a wired or wireless communication channel. Apparatus 700 may be realized using one or more integrated circuits, and may include fewer or more modules than those shown in FIG. 7. Further, apparatus 700 may be integrated in a computer system, or realized as a separate device which is capable of communicating with other computer systems and/or devices. Specifically, apparatus 700 can comprise a detecting module 702, a discovery module 704, a communication module 706, a category-assigning module 708, and a pool-management module 710.

In some embodiments, detecting module 702 can detect a change in value of a server attribute of a server node in a cluster, and discovery module 704 can identify a plurality of server attributes for the server node. Communication module 706 can publish the server node's server attributes to other server nodes in the cluster. Further, communication module 706 can also receive, from another server node in the cluster, a category assignment that assigns the server node to a category, or a pool assignment that assigns the server node to a server pool in the cluster.

In some embodiments, category-assigning module 708 can dynamically assign a category to the server node, such that the category corresponds to the server node's attributes. Pool-management module 710 can select a server node from the cluster to add to the server pool, such that the identified server node satisfies the attribute-requirements for at least one of the server pool's categories.

Figure 8:
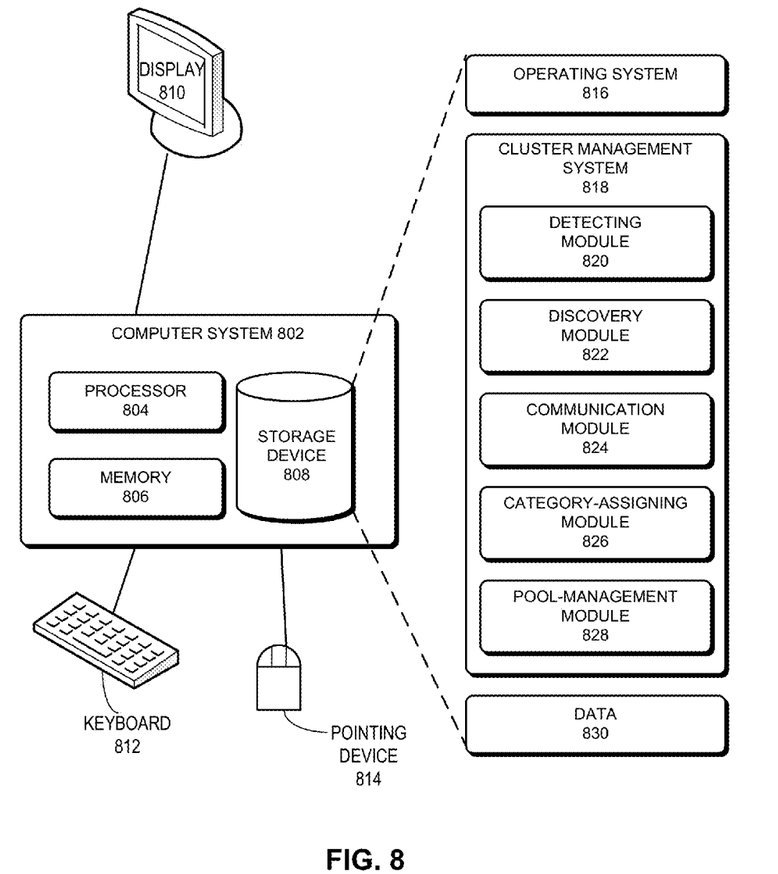
FIG. 8 illustrates an exemplary computer system that facilitates dynamically assigning a category to a server node based on the server node's attribute in accordance with an embodiment of the present invention.

FIG. 8 illustrates an exemplary computer system 802 that facilitates dynamically assigning a category to a server node based on the server node's attribute in accordance with an embodiment of the present invention. Computer system 802 includes a processor 804, a memory 806, and a storage device 808. Memory 806 can include a volatile memory (e.g., RAM) that serves as a managed memory, and can be used to store one or more memory pools. Furthermore, computer system 802 can be coupled to a display device 810, a keyboard 812, and a pointing device 814. Storage device 808 can store operating system 816, cluster management system 818, and data 830.

Cluster management system 818 can include instructions, which when executed by computer system 802, can cause computer system 802 to perform methods and/or processes described in this disclosure. Specifically, cluster management system 818 may include instructions for detecting a change in value of a server attribute of a server node in a cluster (detecting module 820), and for identifying a plurality of server attributes for the server node (discovery module 822). Cluster management system 818 may also include instructions for publishing the server node's server attributes to other server nodes in the cluster, and for receiving a category assignment or a pool assignment for the server node (communication module 824).

Cluster management system 818 may include instructions for dynamically assigning a category to the server node, such that the category corresponds to the server node's attributes (category-assigning module 826). Further, cluster management system 818 may also include instructions for selecting a server node from the cluster to add to the server pool, such that the identified server node satisfies the attribute-requirements for at least one of the server pool's categories (pool-management module 828).

Data 830 can include any data that is required as input or that is generated as output by the methods and/or processes described in this disclosure. Specifically, data 830 can store server attributes for one or more server nodes in a cluster, a category definition that indicates attribute-requirements for a category, one or more assigned categories for a server node or for a server pool in the cluster, and node membership information that indicates a set of nodes that belong to a server pool.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method, comprising:
    detecting a change in value of a server attribute of a first server node in a cluster;
    identifying, by a computer, a plurality of server resource attributes for the first server node, wherein a respective resource attribute indicates a resource available at the first server node;
    dynamically assigning a category to the first server node based at least on the first server node's resource attributes for available resources, wherein the category is associated with a plurality of attribute-requirements that match the first server node's attributes;
    determining a first server pool associated with the category, which involves:
        publishing the first server node's server attributes to other server nodes in the cluster; and
        receiving, from a second server node in the cluster, a pool-assignment that assigns the first server node to the first server pool in the cluster; and
    assigning the first server node to the first server pool.

2. The method of claim 1, wherein the first server node is associated with a first category, wherein the first server node belongs to a first server pool that is associated with the first category, and wherein the method further comprises:
  determining an attribute expression associated with the first category;
  determining attribute-requirements from the attribute expression; and
  in response to determining that the identified attributes for the first server node do not satisfy the attribute-requirements:
    disassociating the first server node from the first category; and
    removing the first server node from the first server pool.

3. The method of claim 2, wherein an application's policy indicates the first category that corresponds to the first server pool, and indicates a minimum number of server nodes for the first server pool, and wherein the method further comprises:
  determining that the first server pool does not satisfy the minimum number of server nodes;
  selecting a second server node from a second server pool, wherein the second server node satisfies the attribute-requirements for the first category, and wherein the second server pool has a lower priority than the first server pool; and
  transferring the second server node from the second server pool to the first server pool.

4. The method of claim 1, wherein the first server node is associated with a first category, and wherein the first server node belongs to a first server pool that is associated with the first category;
  wherein when dynamically assigning the category to the first server node, the method further comprises assigning a second category that is associated with a second server pool; and
  wherein the method further comprises:
    responsive to determining that the second server pool has a higher priority than the first server pool, transferring the first server node to the second server pool;
    selecting an application whose policy indicates the second category; and
    deploying the application on the first server node.

5. The method of claim 4, wherein assigning the second category to the first server node comprises:
  determining an attribute expression associated with the second server category;
  determining attribute-requirements from the attribute expression; and
  determining that the first server node's server attributes satisfy the attribute-requirements.

6. The method of claim 5, wherein the attribute-requirements indicate at least one of:
  a number of server nodes for a server pool;
  a number of available processors at a server node;
  an amount of available random-access memory at a server node;
  an amount of available non-volatile storage memory at a server node;
  an operating system kind;
  an operating system version;
  a geographic location of a server node; and
  a determinable value for a user-defined preference of a server node.

7. The method of claim 1, wherein the change in value of the server attribute includes at least one of:
  the insertion of the first server node into the cluster;
  the removal of the first server node from the cluster;
  a change in a number of available processors for the first server node;
  a change in an amount of random-access memory in the first server node;
  a change in an amount of non-volatile storage memory in the first server node;
  a change in an operating system kind;
  a change in an operating system's version; and
  a change in a numerical value for a user-defined preference of the first server node.

8. A non-transitory computer-readable storage medium storing instructions that when executed by a computer cause the computer to perform a method, the method comprising:
  detecting a change in value of a server attribute of a first server node in a cluster;
  identifying a plurality of server resource attributes for the first server node, wherein a respective resource attribute indicates a resource available at the first server node;
  dynamically assigning a category to the first server node based at least on the first server node's resource attributes for available resources, wherein the category is associated with a plurality of attribute-requirements that match the first server node's attributes;
  determining a first server pool associated with the category, which involves:
    publishing the first server node's server attributes to other server nodes in the cluster; and
    receiving, from a second server node in the cluster, a pool-assignment that assigns the first server node to the first server pool in the cluster; and
  assigning the first server node to the first server pool.

9. The storage medium of claim 8, wherein the first server node is associated with a first category, wherein the first server node belongs to a first server pool that is associated with the first category, and wherein the method further comprises:
  determining an attribute expression associated with the first category;
  determining attribute-requirements from the attribute expression; and
  in response to determining that the first server node's server attributes do not satisfy the attribute-requirements:
    disassociating the first server node from the first category; and
    removing the first server node from the first server pool.

10. The storage medium of claim 9, wherein an application's policy indicates the first category that corresponds to the first server pool, and indicates a minimum number of server nodes for the first server pool, and wherein the method further comprises:
  determining that the first server pool does not satisfy the minimum number of server nodes;
  selecting a second server node from a second server pool, wherein the second server node satisfies the attribute-requirements for the first category, and wherein the second server pool has a lower priority than the first server pool; and
  transferring the second server node from the second server pool to the first server pool.

11. The storage medium of claim 8, wherein the first server node is associated with a first category, and wherein the first server node belongs to a first server pool that is associated with the first category;

wherein when dynamically assigning the category to the first server node, the method further comprises assigning a second category that is associated with a second server pool; and wherein the method further comprises:

responsive to determining that the second server pool has a higher priority than the first server pool, transferring the first server node to the second server pool;

selecting an application whose policy indicates the second category; and deploying the application on the first server node.

12. The storage medium of claim 11, wherein assigning the second category to the first server node comprises:

determining an attribute expression associated with the second server category;

determining attribute-requirements from the attribute expression; and determining that the first server node's server attributes satisfy the attribute-requirements.

13. The storage medium of claim 12, wherein the attribute-requirements indicate at least one of:

a number of server nodes for a server pool;

a number of available processors at a server node;

an amount of available random-access memory at a server node;

an amount of available non-volatile storage memory at a server node;

an operating system kind;

an operating system version;

a geographic location of a server node; and a determinable value for a user-defined preference of a server node.

14. The storage medium of claim 8, wherein the change in value of the server attribute includes at least one of:

the insertion of the first server node into the cluster;

the removal of the first server node from the cluster;

a change in a number of available processors for the first server node;

a change in an amount of random-access memory in the first server node;

a change in an amount of non-volatile storage memory in the first server node;

a change in an operating system kind;

a change in an operating system's version; and a change in a numerical value for a user-defined preference of the first server node.

15. An apparatus comprising:

a processor;

a memory;

a detecting module to detect a change in value of a server attribute of a first server node in a cluster;

a discovery module to identify a plurality of server resource attributes for the first server node, wherein a respective resource attribute indicates a resource available at the first server node;

a category-assigning module to dynamically assign a category to the first server node based at least on the first server node's resource attributes for available resources, wherein the category is associated with a plurality of attribute-requirements that match the first server node's attributes; and a pool-management module to determine a first server pool associated with the category, and assign the first server node to the first server pool, which involves:

publishing the first server node's server attributes to other server nodes in the cluster; and receiving, from a second server node in the cluster, a pool-assignment that assigns the first server node to the first server pool in the cluster.

16. The apparatus of claim 15, wherein the first server node is associated with a first category, wherein the first server node belongs to a first server pool that is associated with the first category, and wherein the category-assigning module is further configured to:

determine an attribute expression associated with the first category;

determine attribute-requirements from the attribute expression; and in response to determining that the first server node's server attributes do not satisfy the attribute-requirements, the category-assigning module is further configured to:

disassociate the first server node from the first category; and remove the first server node from the first server pool.

17. The apparatus of claim 16, wherein an application's policy indicates the first category that corresponds to the first server pool, and indicates a minimum number of server nodes for the first server pool, and wherein the pool-management module is further configured to:

determine that the first server pool does not satisfy the minimum number of server nodes;

select a second server node from a second server pool, wherein the second server node satisfies the attribute-requirements for the first category, and wherein the second server pool has a lower priority than the first server pool; and transfer the second server node from the second server pool to the first server pool.

18. The apparatus of claim 17, wherein the first server node is associated with a first category, wherein the first server node belongs to a first server pool that is associated with the first category;

wherein when dynamically assigning the first server node to a category, the category-assigning module is further configured to assign, to the first server node, a second category associated with a second server pool; and wherein the pool-management module is further configured to:

responsive to determining that the second server pool has a higher priority than the first server pool, transfer the first server node to the second server pool;

select an application whose policy indicates the second category; and deploy the application on the first server node.

19. The apparatus of claim 18, wherein when assigning the second category to the first server node, the category-assigning module is further configured to:

determine an attribute expression associated with the second server category;

determine attribute-requirements from the attribute expression; and determine that the first server node's server attributes satisfy the attribute-requirements.

20. The apparatus of claim 19, wherein the attribute-requirements indicate at least one of:

a number of server nodes for a server pool;

a number of available processors at a server node;

an amount of available random-access memory at a server node;

an amount of available non-volatile storage memory at a server node;

an operating system kind;

an operating system version;

a geographic location of a server node; and a determinable value for a user-defined preference of a server node.

21. The apparatus of claim 15, wherein the change in value of the server attribute includes at least one of:

the insertion of the first server node into the cluster;

the removal of the first server node from the cluster;

a change in a number of available processors for the first server node;

a change in an amount of random-access memory in the first server node;

a change in an amount of non-volatile storage memory in the first server node;

a change in an operating system kind;

a change in an operating system's version; and a change in a numerical value for a user-defined preference of the first server node.

* * * * *

UNITED STATES PATENT AND TRADEMARK OFFICE
CERTIFICATE OF CORRECTION

PATENT NO. : 8,954,557 B2  
APPLICATION NO. : 13/401638  
DATED : February 10, 2015  
INVENTOR(S) : Gusev et al.

Page 1 of 1

It is certified that error appears in the above-identified patent and that said Letters Patent is hereby corrected as shown below:

In column 7, line 20, delete "214)" and insert -- 214). --, therefor.

Signed and Sealed this
Twenty-fourth Day of November, 2015

Michelle K. Lee
*Director of the United States Patent and Trademark Office*